(12) United States Patent
Nemoto

(10) Patent No.: US 10,083,049 B2
(45) Date of Patent: Sep. 25, 2018

(54) INFORMATION PROCESSING DEVICE AND METHOD, AND NON-TRANSITORY COMPUTER READABLE MEDIUM

(71) Applicant: FUJI XEROX CO., LTD., Tokyo (JP)

(72) Inventor: Yoshihiko Nemoto, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 261 days.

(21) Appl. No.: 15/096,440

(22) Filed: Apr. 12, 2016

(65) Prior Publication Data
US 2017/0161086 A1    Jun. 8, 2017

(30) Foreign Application Priority Data

Dec. 7, 2015   (JP) ................. 2015-238354

(51) Int. Cl.
*G08B 1/08* (2006.01)
*G06F 9/445* (2018.01)
*G06Q 10/08* (2012.01)

(52) U.S. Cl.
CPC ....... *G06F 9/44536* (2013.01); *G06Q 10/083* (2013.01)

(58) Field of Classification Search
None
See application file for complete search history.

(56) References Cited

U.S. PATENT DOCUMENTS

| | | | | |
|---|---|---|---|---|
| 2002/0010519 A1* | 1/2002 | Watanabe | ............. | G05B 15/02 700/83 |
| 2009/0322510 A1* | 12/2009 | Berger | ................. | G06Q 10/08 340/539.1 |
| 2017/0365025 A1* | 12/2017 | Pumphrey | ............. | G06Q 50/22 |

FOREIGN PATENT DOCUMENTS

| | | |
|---|---|---|
| JP | 2004-284825 A | 10/2004 |
| JP | 2004-323169 A | 11/2004 |
| JP | 2005-030937 A | 2/2005 |
| JP | 2012-197136 A | 10/2012 |

OTHER PUBLICATIONS

Notification of Reasons for Refusal of Japanese Application No. 2015-238354 dated Feb. 9, 2016.

* cited by examiner

*Primary Examiner* — Brent Swarthout
(74) *Attorney, Agent, or Firm* — Sughrue Mion, PLLC

(57) ABSTRACT

An information processing device includes first and second detectors and a controller. The first detector detects a shipping situation of an apparatus. The second detector detects that a predetermined operation has been performed. The controller performs control so that a detection result indicating the shipping situation of the apparatus will be stored in a first memory until the second detector detects that the predetermined operation has been performed. After the second detector detects that the predetermined operation has been performed, the first detector is switched to be able to detect an operating condition of the apparatus.

18 Claims, 15 Drawing Sheets

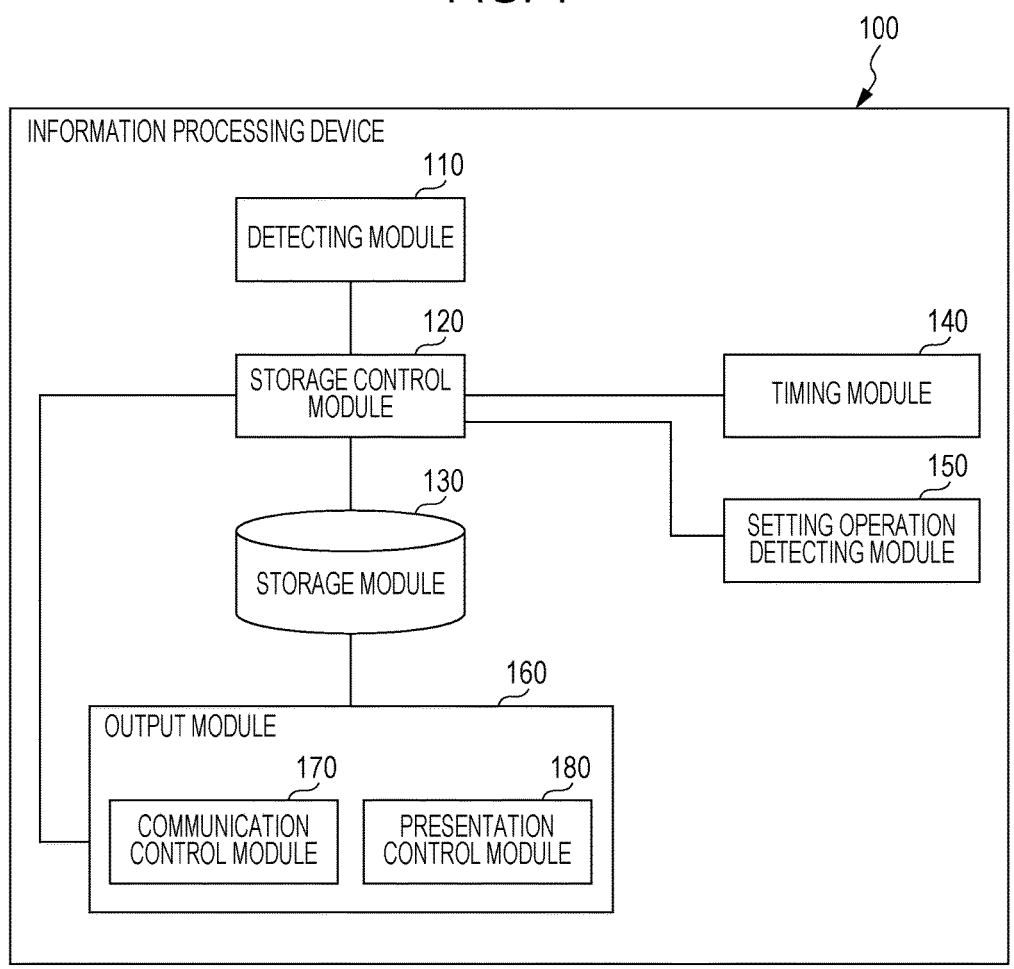

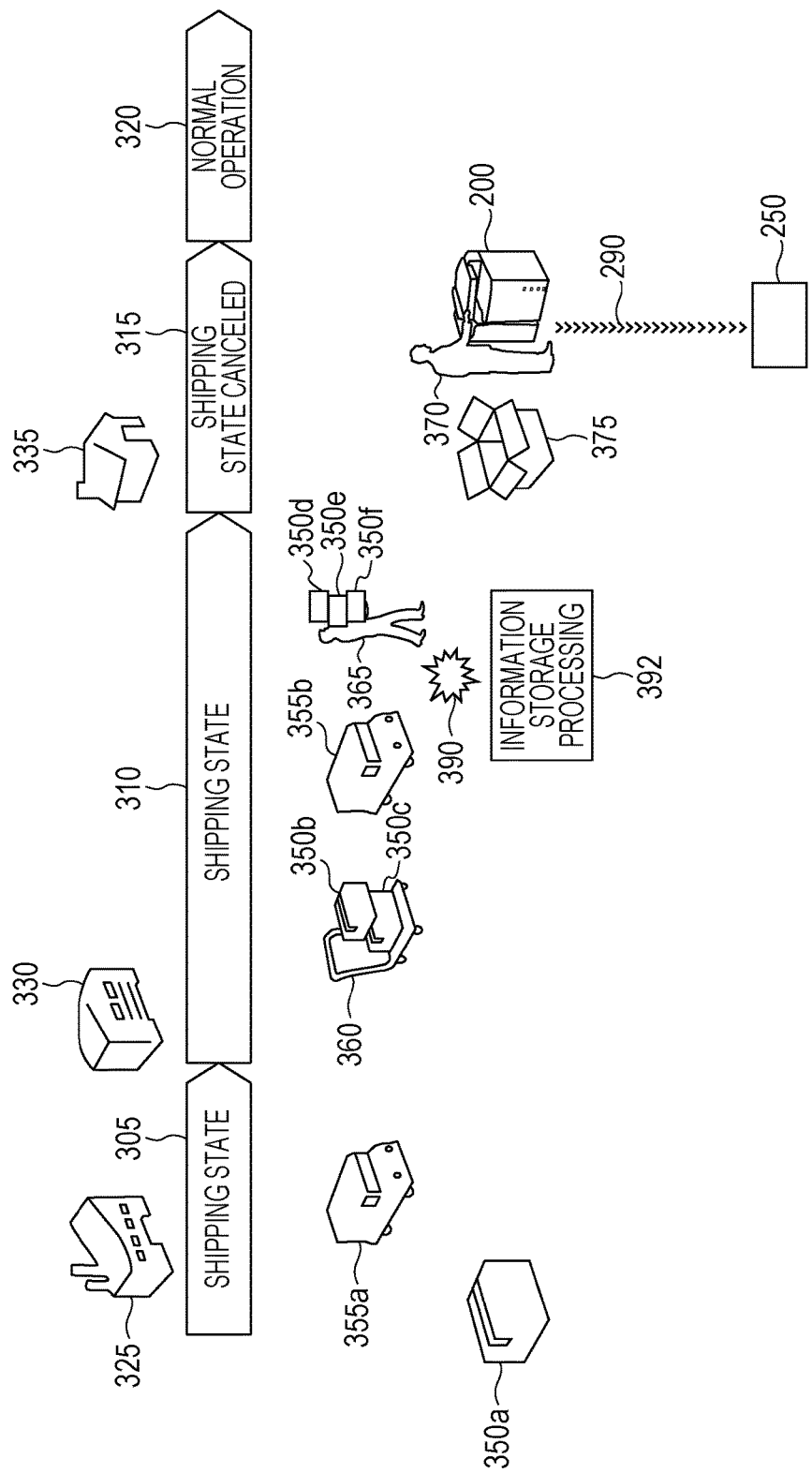

INFORMATION PROCESSING DEVICE AND METHOD, AND NON-TRANSITORY
COMPUTER READABLE MEDIUM

CROSS-REFERENCE TO RELATED APPLICATIONS

This application is based on and claims priority under 35 USC 119 from Japanese Patent Application No. 2015-238354 filed Dec. 7, 2015.

BACKGROUND

Technical Field

The present invention relates to an information processing device and method and a non-transitory computer readable medium.

SUMMARY

According to an aspect of the invention, there is provided an information processing device including first and second detectors and a controller. The first detector detects a shipping situation of an apparatus. The second detector detects that a predetermined operation has been performed. The controller performs control so that a detection result indicating the shipping situation of the apparatus will be stored in a first memory until the second detector detects that the predetermined operation has been performed. After the second detector detects that the predetermined operation has been performed, the first detector is switched to be able to detect an operating condition of the apparatus.

BRIEF DESCRIPTION OF THE DRAWINGS

Exemplary embodiments of the present invention will be described in detail based on the following figures, wherein:

FIG. 1 is a block diagram of conceptual modules forming an example of the configuration of a first exemplary embodiment;

FIG. 3 illustrates an example of processing performed in the first exemplary embodiment;

DETAILED DESCRIPTION

Figure 2A:
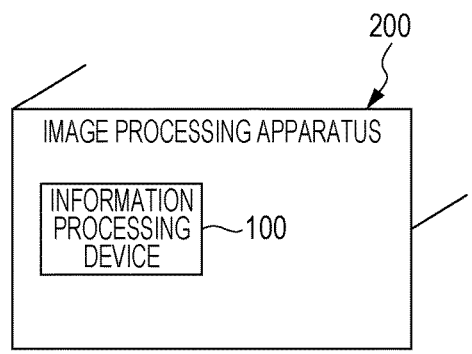
FIGS. 2A and 2B illustrate examples of the configuration of a system utilizing the first exemplary embodiment.

Exemplary embodiments of the invention will be described below with reference to the accompanying drawings.

First Exemplary Embodiment

FIG. 1 is a block diagram of conceptual modules forming an example of the configuration of a first exemplary embodiment of the invention.

Generally, modules are software (computer programs) components or hardware components that can be logically separated from one another. Accordingly, the modules of the exemplary embodiments of the invention are not only modules of a computer program, but also modules of a hardware configuration. Thus, the exemplary embodiments will also be described in the form of a computer program for allowing a computer to function as those modules (a program for causing a computer to execute program steps, a program for allowing a computer to function as corresponding units, or a computer program for allowing a computer to implement corresponding functions), a system, and a method. While expressions such as "store", "storing", "being stored", and equivalents thereof are used for the sake of description, such expressions indicate, when the exemplary embodiments relate to a computer program, storing the computer program in a storage device or performing control so that the computer program is stored in a storage device. Modules may correspond to functions based on a one-to-one relationship. In terms of implementation, however, one module may be constituted by one program, or plural modules may be constituted by one program. Conversely, one module may be constituted by plural programs. Additionally, plural modules may be executed by using a single computer, or one module may be executed by using plural computers in a distributed or parallel environment. One module may integrate another module therein. Hereinafter, the term "connection" includes not only physical connection, but also logical connection (sending and receiving of data, giving instructions, reference relationships among data elements, etc.). The term "predetermined" means being determined prior to a certain operation, and includes the meaning of being determined prior to a certain operation before starting processing of the exemplary embodiments, and also includes the meaning of being determined prior to a certain operation even after starting processing of the exemplary embodiments, in accordance with the current situation/state or in accordance with the previous situation/state. If there are plural "predetermined values", they may be different values, or two or more of the values (or all the values) may be the same. A description having the meaning "in the case of A, B is performed" is used as the meaning "it is determined whether the case A is satisfied, and B is performed if it is determined that the case A is satisfied", unless such a determination is unnecessary.

A system or an apparatus may be realized by connecting plural computers, hardware units, devices, etc., to one another via a communication medium, such as a network (including communication based on a one-to-one correspondence), or may be realized by a single computer, hardware unit, device, etc. The terms "apparatus" and "system" are used synonymously. The term "system" does not include merely a man-made social "mechanism" (social system).

Additionally, every time an operation is performed by using a corresponding module or every time each of plural operations is performed by using a corresponding module, target information is read from a storage device, and after performing the operation, a processed result is written into the storage device. Accordingly, a description of reading from the storage device before an operation or writing into the storage device after an operation may be omitted. Examples of the storage device may be a hard disk (HD), a random access memory (RAM), an external storage medium, a storage device using a communication line, a register within a central processing unit (CPU), etc.

An information processing device 100 of the first exemplary embodiment detects the shipping situation of an apparatus in which the information processing device 100 is installed. As shown in FIG. 1, the information processing device 100 includes a detecting module 110, a storage control module 120, a storage module 130, a timing module 140, a setting operation detecting module 150, and an output module 160. The information processing device 100 is installed in the apparatus also for detecting the operating conditions of the apparatus. For example, the information processing device 100 includes components for detecting the conditions of the apparatus, and more specifically, the information processing device 100 includes sensors (such as a thermo-hygrometer, an acceleration sensor, and a vibration sensor) for detecting or predicting the occurrence of abnormalities in the apparatus (including components within the apparatus). The information processing device 100 may utilize batteries (such as cell batteries and storage batteries) as power or may receive power from a mobile body that is transporting the apparatus.

The apparatus in which the information processing device 100 is installed may be any apparatus which inherently integrates the information processing device 100 therein. For example, the apparatus may be an image processing apparatus 200, such as a copying machine, a fax machine, a scanner, a printer, and a multifunction device (an image processing apparatus having two or more functions of a scanner, a printer, a copying machine, and a fax machine), which will be discussed later, or may be a personal computer (PC), a mobile information communication device (including a cellular phone, a smartphone, a mobile device, and a wearable computer), a home information appliance, or a robot.

An apparatus is manufactured in a factory and is then shipped from the factory to a certain place where the apparatus will be set up. In this case, the setting up of the apparatus is an operation for making this apparatus usable.

The quality of physical distribution (logistics) may be improved by finding how apparatuses are handled during shipping, such as whether apparatuses are subjected to shock or are placed upside down or sideways.

In the related art, however, for obtaining information concerning the shipping situation, extra devices, such as a detector (sensor), a wireless communication device, and a camera imaging device, are necessary separately from an apparatus to be shipped. Additionally, after the shipping of the apparatus has been completed, such extra devices are no longer necessary.

In the first exemplary embodiment, an apparatus to be shipped includes detectors, such as an acceleration sensor and a vibration sensor. If initial settings have not yet been set in the apparatus, the state of the apparatus is determined to be a shipping state, which will be discussed later, and the shipping situation detected by the detectors is stored in the storage module 130. When initial settings are set in the apparatus, the shipping situation is read from the storage module 130 and is output.

The detecting module 110 is connected to the storage control module 120. The detecting module 110 detects the shipping situation of an apparatus including the information processing device 100. The detecting module 110 also detects the operating conditions of the apparatus. Examples of the detecting module 110 are a thermo-hygrometer, an acceleration sensor, and a vibration sensor, and these elements are used for achieving the high performance of the apparatus. More specifically, if the apparatus is an image processing apparatus, the detecting module 110 may be a thermometer for measuring the temperature of a drum. As sensors for measuring the environments of the image processing apparatus, an acceleration sensor and a vibration sensor are disposed, and these sensors may also be used as the detecting module 110. The sensitivity and the detection period (timing and cycle) of the detecting module 110 may be set and changed as desired. Accordingly, it is possible to change the sensitivity and the detection period of the detecting module 110 between when the shipping situation of the apparatus is detected and when the operating conditions of the apparatus are detected.

When the setting operation detecting module 150 detects that a predetermined operation has been performed (hereinafter may simply be referred to as "the setting operation detecting module 150 detects the predetermined operation"), the detecting module 110 is switched to be able to detect the operating conditions of the apparatus. In other words, the purpose of the use of the detecting module 110 is changed. That is, the detecting module 110 performs the intended functions in the apparatus.

The timing module 140 is connected to the storage control module 120. The timing module 140 has a function of measuring the date (year, month, day, hour, minute, second, millisecond, or a combination thereof). An example of the timing module 140 is a timer (real-time clock (RTC)).

The setting operation detecting module 150 is connected to the storage control module 120. The setting operation detecting module 150 detects a predetermined operation. A predetermined operation is an operation performed on the apparatus. If the predetermined operation is detected by the setting operation detecting module 150, it means that the shipping state is canceled. An example of the predetermined operation is an operation for making the apparatus usable, for example, an operation for setting initial settings in the apparatus by a user. More specifically, a person in charge of the setting up of the apparatus sets initial settings in the apparatus by using a user interface, for example, a touch screen. If initial settings are not required, the predetermined operation may be an operation for powering ON the apparatus or a user operation for starting the apparatus by pressing a button or via data communication.

Figure 4:
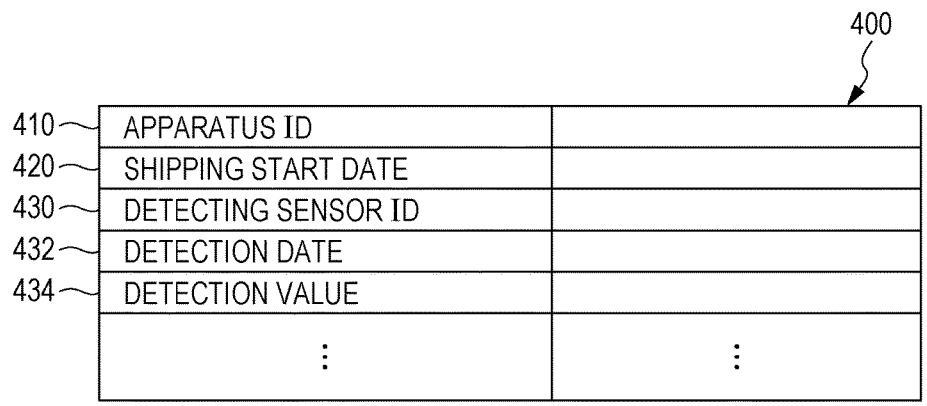
FIG. 4 illustrates an example of the data structure of a shipping situation table.

The storage control module 120 is connected to the detecting module 110, the storage module 130, the timing module 140, the setting operation detecting module 150, and the output module 160. Until the setting operation detecting module 150 detects a predetermined operation, the storage control module 120 performs control so that detection results indicating the shipping situation of the apparatus received from the detecting module 110 will be stored in the storage module 130. The storage control module 120 may perform control so that detection results will be stored together with the detection date (information concerning the date obtained from the timing module 140). The storage control module 120 may perform control so that a shipping situation table 400, for example, will be stored in the storage module 130. FIG. 4 illustrates an example of the data structure of the shipping situation table 400. The shipping situation table 400 has an apparatus identification (ID) field 410, a shipping start date field 420, a detecting sensor ID field 430, a detection date field 432, and a detection value field 434. In the apparatus ID field 410, information (apparatus ID) for uniquely identifying the apparatus in the first exemplary embodiment is stored. In the shipping start date field 420, the date on which shipping is started is stored. In the detecting sensor ID field 430, information for uniquely identifying the detecting sensor (detecting sensor ID) in the first exemplary embodiment is stored. In the detection date field 432, the date on which the shipping situation is detected is stored. In the detection value field 434, a detection value is stored. Subsequent to the detection value field 434 shown in FIG. 4, sets of the detecting sensor ID field 430, the detection date field 432, and the detection value field 434 are repeated. If analysis is conducted to detect whether or not shock is applied to the apparatus, the detection date field 432 may be omitted.

The storage control module 120 may perform control so that a detection result of the detecting module 110 will be stored in the storage module 130 if the value representing this detection result is within a predetermined range. In this case, the predetermined range is represented by a value or plural values (which also applies to the other exemplary embodiments). Accordingly, the predetermined range may be specified by a certain value (if the value representing the detection result is within the predetermined range, it means that it coincides with the value specifying the predetermined range), an upper limit value, a lower limit value, or an upper limit value and a lower limit value. Accordingly, if the value representing the detection result is within the predetermined range, it may mean that the value is greater than a predetermined threshold or lower than a predetermined threshold. For example, if the detection result indicating the shipping situation represents a predetermined value, the storage control module 120 determines that an unusual incident (shipping situation) has taken place, and performs control so that the detection result will be stored in the storage module 130. This makes it possible to decrease the storage amount and makes it easy to analyze an unusual shipping situation. The predetermined range may be changed between when the shipping situation is detected and when the operating conditions of the apparatus are detected.

If the value representing the detection result of the detecting module 110 is within the predetermined range, the storage control module 120 may perform control so that a warning will be output to a person transporting the apparatus, a supervisor of the apparatus (for example, a manufacturer and a customer engineer), or a purchaser of the apparatus. An example of the person transporting the apparatus is a driver of a mobile body. More specifically, a warning is output to an information processing terminal (including a mobile terminal and an information processing device provided in the mobile body such as a transport vehicle) of the person transporting the apparatus. A warning may be output by displaying it on a display, printing it by a printer, outputting it as sound to a sound output device such as a speaker, issuing it as vibration, or by a combination thereof. By issuing a warning, an unusual shipping situation may be changed to a usual situation. The predetermined range for which a warning is output may be changed between before and after the apparatus is set up (during shipping).

The storage module 130 is connected to the storage control module 120 and the output module 160. The storage module 130 stores detection results of the detecting module 110 under the control of the storage control module 120. An example of the storage module 130 is a semiconductor memory. The storage module 130 may be disposed within the information processing device 100 or outside of the information processing device 100. If the storage module 130 is disposed outside of the information processing device 100, it communicates with the storage control module 120 via a wireless communication medium, a wired communication medium, or a combination thereof, and stores detection results of the detecting module 110.

If the predetermined operation is detected by the setting operation detecting module 150, the storage module 130 may be switched to a unit that performs control so that the settings of the apparatus will be read from or stored in the storage module 130 in accordance with the detected shipping situation. In other words, the purpose of the use of the storage module 130 is changed. That is, the settings of the apparatus are optimized so that the high performance of the apparatus can be achieved. The storage module 130 may be constituted by two storage units, that is, one unit for storing the shipping situation and the other unit for storing information (for example, history information) necessary for the operation of the apparatus. Alternatively, the storage module 130 may be constituted by one storage unit in which the shipping situation and information necessary for the operation of the apparatus are stored in different storage areas. Alternatively, after a storage area for storing the shipping situation is set, it may also be used as a storage area for storing information necessary for the operation of the apparatus. Specific examples of the optimization of the settings of the apparatus so as to achieve the high performance of the apparatus are as follows. For example, if the apparatus is a multifunction device and if this multifunction device is subjected to a considerable shock during shipping, the value for adjusting the side register is changed from a normal value. If the temperature or the humidity around the multifunction device during shipping exceeds a possible normal range, the charging voltage, the transfer voltage, the period of time and the number of times that toner agitation and toner supply is performed, the period of time and the number of times that cleaning is performed are changed from normal values. Regarding a product other than a multifunction device, calibration values of measuring units and sensors may be changed according to the shipping situation, or settings may be changed according to the shipping situation.

The output module 160 includes a communication control module 170 and a presentation control module 180, and is connected to the storage control module 120 and the storage module 130. When the predetermined operation is detected by the setting operation detecting module 150, the output module 160 outputs detection results stored in the storage module 130. Outputting of detection results includes informing a user of the shipping situation and communicating of the shipping situation to a shipping supervisor. The timing at which the output module 160 outputs detection results may be any time after (including immediately after) the predetermined operation is detected by the setting operation detecting module 150.

The communication control module 170 communicates the shipping situation to a shipping supervisor. When the predetermined operation is detected by the setting operation detecting module 150, the communication control module 170 reads detection results from the storage module 130 and communicates the shipping situation to the shipping supervisor. The communication control module 170 has a function of communicating with devices (a communication partner and a receiver of detection results) other than the information processing device 100 via a wireless communication medium, a wired communication medium, or a combination thereof.

The presentation control module 180 informs a user of the shipping situation. When the predetermined operation is detected by the setting operation detecting module 150, the presentation control module 180 reads detection results from the storage module 130 and informs a user of the shipping situation. An example of the presentation control module 180 is a liquid crystal display used as a user interface.

Figure 2B:
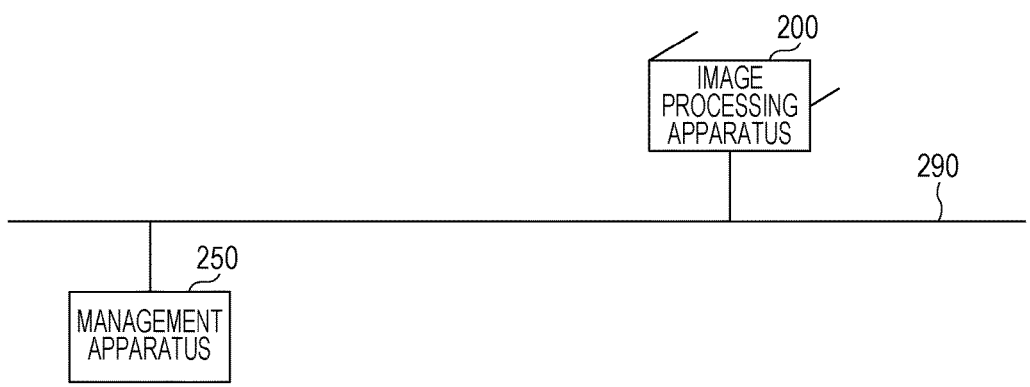

FIGS. 2A and 2B illustrate examples of the configuration of a system utilizing the first exemplary embodiment.

In the example shown in FIG. 2A, the image processing apparatus 200, which is an apparatus to be shipped, includes the information processing device 100. When the image processing apparatus 200 performs the intended functions (such as copying and printing), the information processing device 100 detects the operating conditions of the image processing apparatus 200. When the image processing apparatus 200 is in the shipping state, the information processing device 100 detects the shipping situation of the image processing apparatus 200.

In the example shown in FIG. 2B, the image processing apparatus 200 including the information processing device 100 is connected to a management apparatus 250 via a communication line 290. After the image processing apparatus 200 has been set up (that is, the shipping state is canceled), the information processing device 100 sends detection results indicating the shipping situation of the image processing apparatus 200 to the management apparatus 250. The management apparatus 250 receives the detection results indicating the shipping situation of the image processing apparatus 200 and conducts analysis to find out how the image processing apparatus 200 has been handled during shipping.

FIG. 3 illustrates an example of processing performed in the first exemplary embodiment.

The image processing apparatus 200 is manufactured in a factory 325. Then, the image processing apparatus 200 is packed as a packed product 350a and is shipped to a warehouse 330 by, for example, a truck 355a (shipping state 305).

Then, when the image processing apparatus 200 is sold, it is shipped from the warehouse 330 to an office 335 (shipping state 310). In the shipping states 305 and 310, as shown in the examples of FIG. 3, packed products 350b and 350c are stacked and carried with a hand truck 360 and are transported by a truck 355b, and packed products 350d, 350e, and 350f are carried by a delivery person 365. While a packed product is being handled in this manner, if a shock 390 is applied to the packed product due to, for example, harsh braking, the value representing the detection result of the detecting module 110 may be within a predetermined range. In this case, the information processing device 100 performs information storage processing 392.

In the office 335 where the image processing apparatus 200 will be set up, the packed product 350 is unpacked and the image processing apparatus 200 is taken out of a packing box 375. Then, an operator 370 performs an initial setting operation (shipping state canceled 315). Upon completion of the initial setting operation, the information processing device 100 within the image processing apparatus 200 cancels the shipping state and sends the detection results indicating the shipping situation to the management apparatus 250 via the communication line 290.

In the image processing apparatus 200 in which initial settings have been set, the intended operation (such as copying) of the image processing apparatus 200 is performed as a normal operation 320. During the normal operation 320, the information processing device 100 detects the operating conditions of the image processing apparatus 200.

Figure 5:
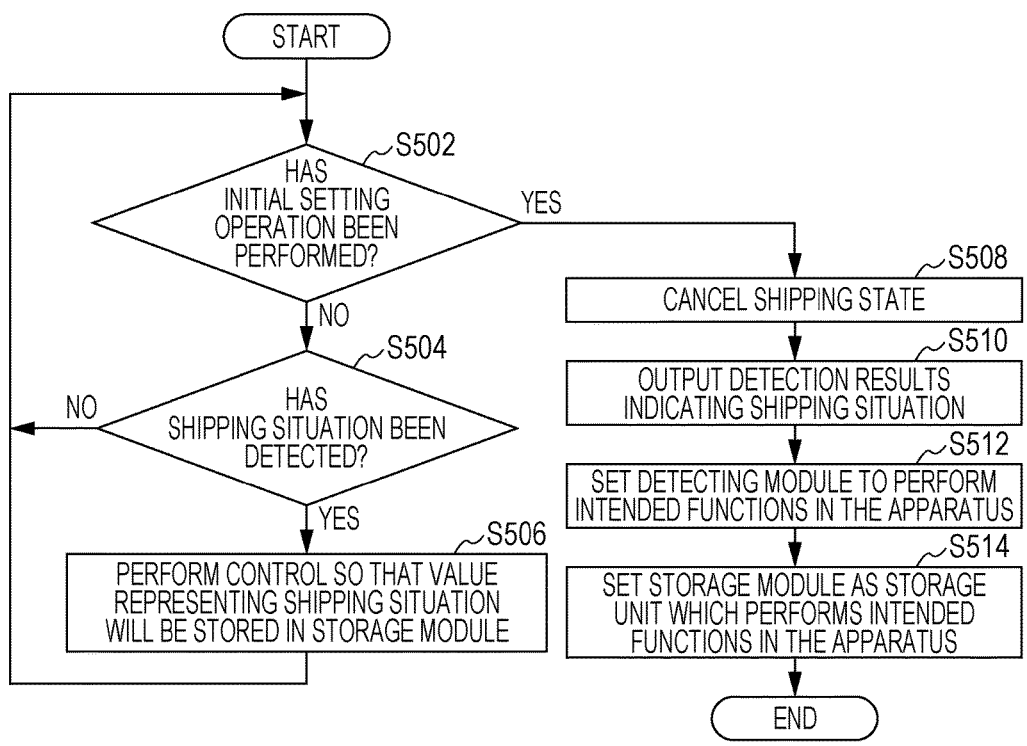
FIG. 5 is a flowchart illustrating an example of processing executed in the first exemplary embodiment.

FIG. 5 is a flowchart illustrating an example of processing executed in the first exemplary embodiment.

In step S502, the setting operation detecting module 150 determines whether or not an initial setting operation has been performed. If the result of step S502 is YES, the process proceeds to step S508. If the result of step S502 is NO, the process proceeds to step S504. An initial setting operation is an operation to be performed when the apparatus is set up. Accordingly, if the initial setting operation has been performed, the setting operation detecting module 150 determines that the shipping of the apparatus has been completed (shipping state is canceled).

In step S504, the detecting module 110 determines whether or not the shipping situation has been detected. If the result of step S504 is YES, the process proceeds to step S506. If the result of step S504 is NO, the process returns to step S502. The detecting module 110 may detect the shipping situation at predetermined regular intervals (regularly).

In step S506, the storage control module 120 performs control so that the value representing the shipping situation will be stored in the storage module 130. The storage control module 120 may perform control so that the value representing the detection result will be stored in the storage module 130 only when the value is within a predetermined range.

In step S508, the storage control module 120 cancels the shipping state.

In step S510, the output module 160 outputs detection results indicating the shipping situation stored in the storage module 130. For example, the output module 160 may display the shipping situation on a display such as a liquid crystal display of the apparatus, or may communicate the shipping situation to the management apparatus 250.

In step S512, the detecting module 110 is set so as to perform the intended functions in the apparatus.

In step S514, the storage module 130 is set as a storage unit which performs the intended functions in the apparatus.

In the example of this flowchart, the shipping state is set to be a default state. However, the operation in this flowchart may be started upon detecting that a predetermined operation (an operation for shifting to the shipping state) has been performed.

Second Exemplary Embodiment

Figure 6:
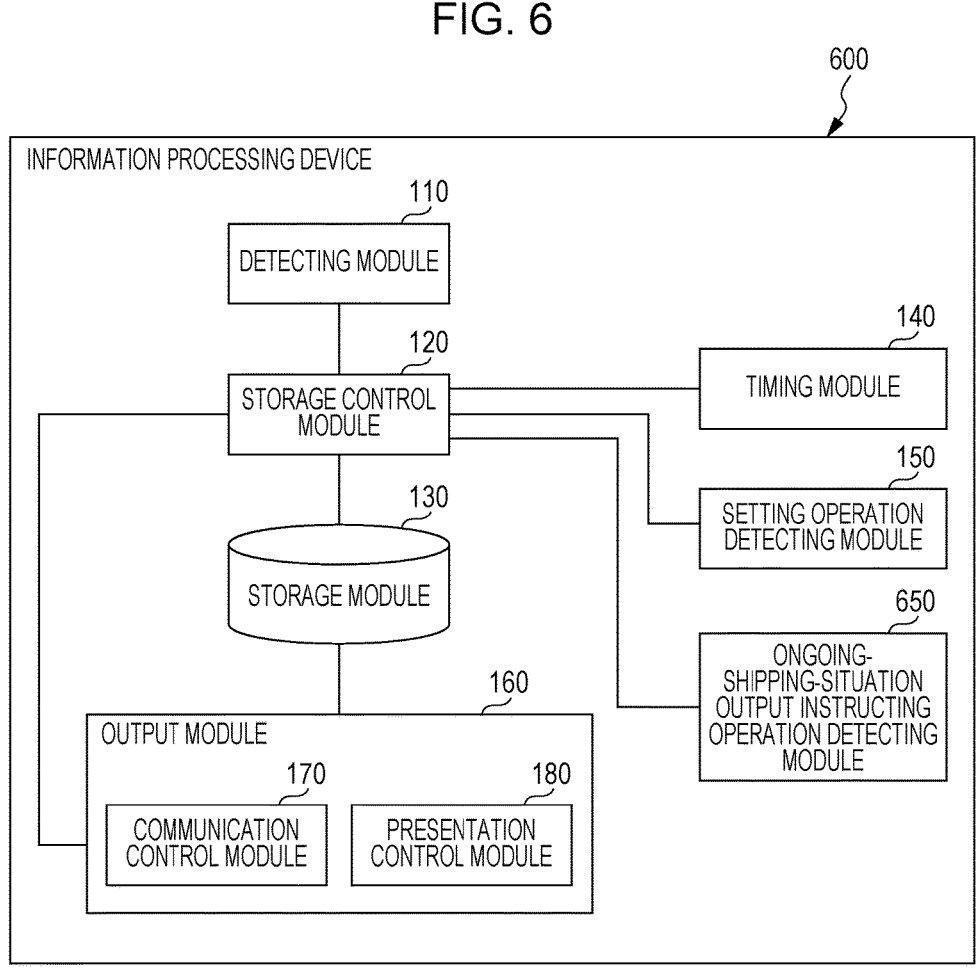
FIG. 6 is a block diagram of conceptual modules forming an example of the configuration of a second exemplary embodiment.

FIG. 6 is a block diagram of conceptual modules forming an example of the configuration of a second exemplary embodiment.

An information processing device 600 includes a detecting module 110, a storage control module 120, a storage module 130, a timing module 140, a setting operation detecting module 150, an ongoing-shipping-situation output instructing operation detecting module 650, and an output module 160. That is, the ongoing-shipping-situation output instructing operation detecting module 650 is added to the elements of the first exemplary embodiment. The elements identical to or similar to those of the first exemplary embodiment are designated by like reference numerals, and an explanation thereof will thus be omitted (which also applies to third and fourth exemplary embodiments).

The detecting module 110 is connected to the storage control module 120.

The timing module 140 is connected to the storage control module 120.

The setting operation detecting module 150 is connected to the storage control module 120.

The ongoing-shipping-situation output instructing operation detecting module 650 is connected to the storage control module 120. The ongoing-shipping-situation output instructing operation detecting module 650 detects that a predetermined second operation has been performed (hereinafter may simply be referred to as "the ongoing-shipping-situation output instructing operation detecting module 650 detects the predetermined second operation"). The predetermined second operation is an operation to be performed before the setting operation detecting module 150 detects the predetermined operation, and is an operation for giving an instruction to output information concerning an ongoing shipping situation. An example of the predetermined second operation is communication performed by an ongoing shipping situation detecting device 700 shown in FIG. 7, which will be discussed later, that is, wireless communication performed between the ongoing shipping situation detecting device 700 and the apparatus which is in a packing box.

The storage module 130 is connected to the storage control module 120 and the output module 160.

The output module 160 includes a communication control module 170 and a presentation control module 180, and is connected to the storage control module 120 and the storage module 130. If the predetermined second operation is detected by the ongoing-shipping-situation output instructing operation detecting module 650 before the predetermined operation is detected by the setting operation detecting module 150, the output module 160 outputs detection results stored in the storage module 130. Upon detecting the predetermined second operation, the output module 160 outputs detection results indicating the shipping situation up to the present time (information indicating the ongoing shipping situation) without having to cancel the shipping state. The detection results may be output to, for example, the ongoing shipping situation detecting device 700. The timing at which the output module 160 outputs the detection results may be any time after (including immediately after) the predetermined second operation is detected by the ongoing-shipping-situation output instructing operation detecting module 650.

The storage control module 120 is connected to the detecting module 110, the storage module 130, the timing module 140, the setting operation detecting module 150, the ongoing-shipping-situation output instructing operation detecting module 650, and the output module 160. The storage control module 120 may delete the detection results indicating the shipping situation stored in the storage module 130 after the predetermined second operation is detected by the ongoing-shipping-situation output instructing operation detecting module 650 and after the output results stored in the storage module 130 are output by the output module 160. That is, after information indicating the ongoing shipping situation is output, the storage module 130 may be initialized.

Figure 7A:
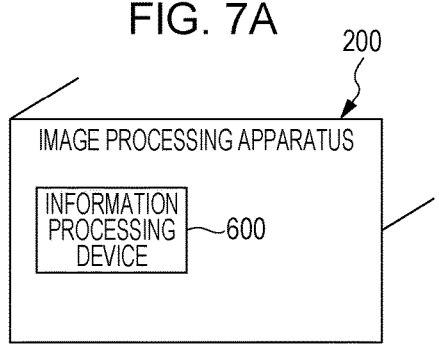
FIGS. 7A through 7C illustrate examples of the configuration of a system utilizing the second exemplary embodiment.
Figure 7B:
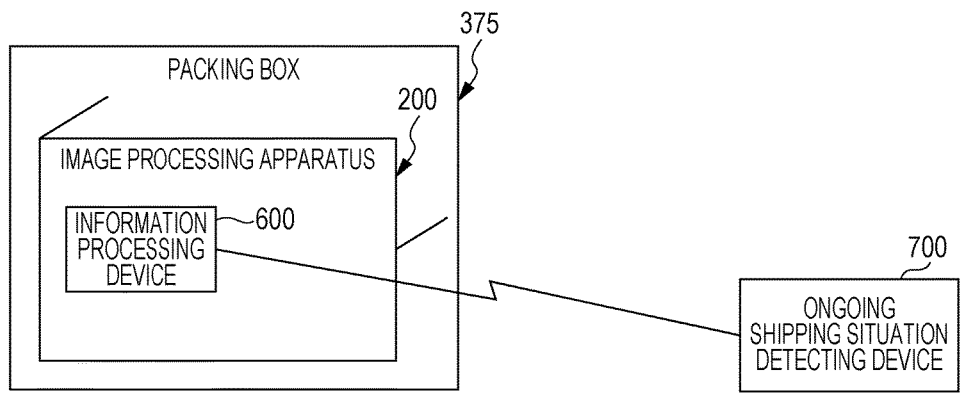
Figure 7C:
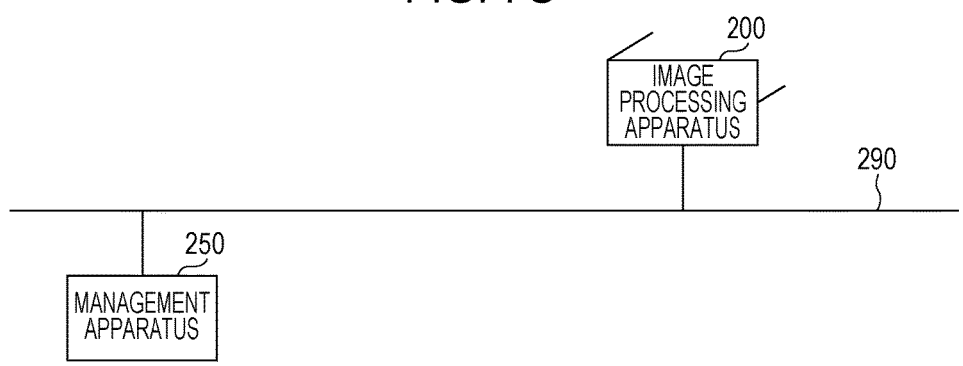

FIGS. 7A, 7B, and 7C illustrate examples of the configuration of a system utilizing the second exemplary embodiment.

The example shown in FIG. 7A is equivalent to that shown in FIG. 2A. The image processing apparatus 200, which is an apparatus to be shipped, includes the information processing device 600.

In the example shown in FIG. 7B, the image processing apparatus 200 in a packing box 375 during shipping communicates with the ongoing shipping situation detecting device 700. The ongoing shipping situation detecting device 700 performs the predetermined second operation on the image processing apparatus 200 via wireless communication. The ongoing shipping situation detecting device 700 then receives information indicating the shipping situation of the image processing apparatus 200 and conducts analysis to find out how the image processing apparatus 200 has been handled so far during shipping. Alternatively, the ongoing shipping situation detecting device 700 may transfer the received information to the management apparatus 250. The ongoing shipping situation detecting device 700 performs the predetermined second operation via, for example, near field communication, as wireless communication. The information processing device 600 within the image processing apparatus 200 outputs detection results indicating the ongoing shipping situation to the ongoing shipping situation detecting device 700. Thereafter, the storage module 130 may be initialized.

The example shown in FIG. 7C is equivalent to that shown in FIG. 2B. When the image processing apparatus 200 has been set up, the information processing device 600 sends detection results indicating the shipping situation of the image processing apparatus 200 to the management apparatus 250. In this case, the detection results to be sent to the management apparatus 250 may include or may not include a detection result output to the ongoing shipping situation detecting device 700. The management apparatus 250 then receives the detection results indicating the shipping situation of the image processing apparatus 200 and conducts analysis to find out how the image processing apparatus 200 has been handled during shipping.

Figure 8:
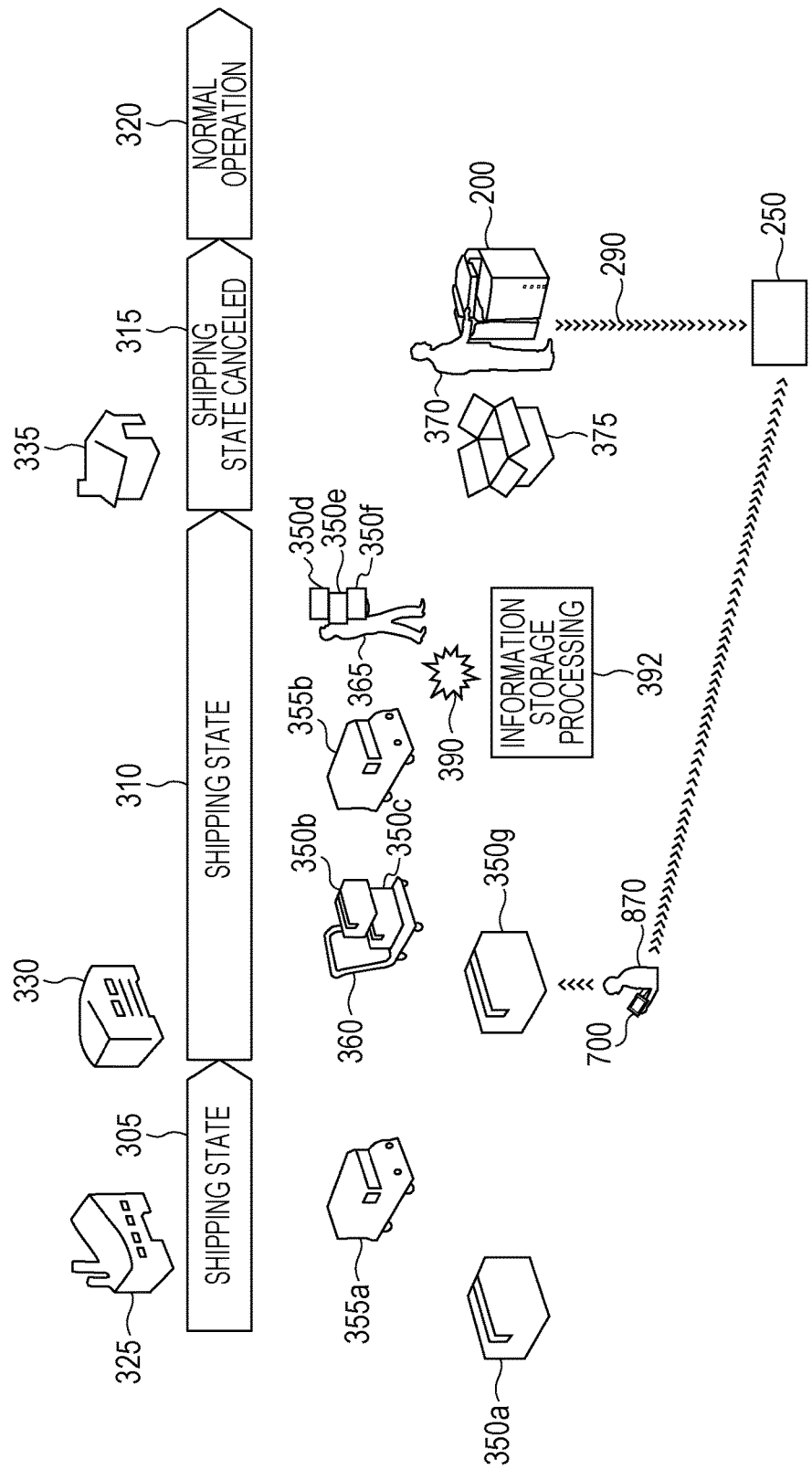
FIG. 8 illustrates an example of processing performed in the second exemplary embodiment.

FIG. 8 illustrates an example of processing performed in the second exemplary embodiment. In the example shown in FIG. 8, an example in which an operator 870 extracts the ongoing shipping situation of the image processing apparatus 200 by using the ongoing shipping situation detecting device 700 in the warehouse 330 is added to the example shown in FIG. 3.

In the warehouse 330, the operator 870 approaches a packed product 350g and operates the ongoing shipping situation detecting device 700 to communicate with the information processing device 600 of the image processing apparatus 200 within the packed product 350g. Then, the information processing device 600 transfers the detection results stored in the storage module 130 to the ongoing shipping situation detecting device 700. The ongoing shipping situation detecting device 700 transfers the detection results to the management apparatus 250. At this time point, if the management apparatus 250 detects the occurrence of any abnormality in the detection results, it may send an instruction to check the image processing apparatus 200 to the operator 870.

Figure 9:
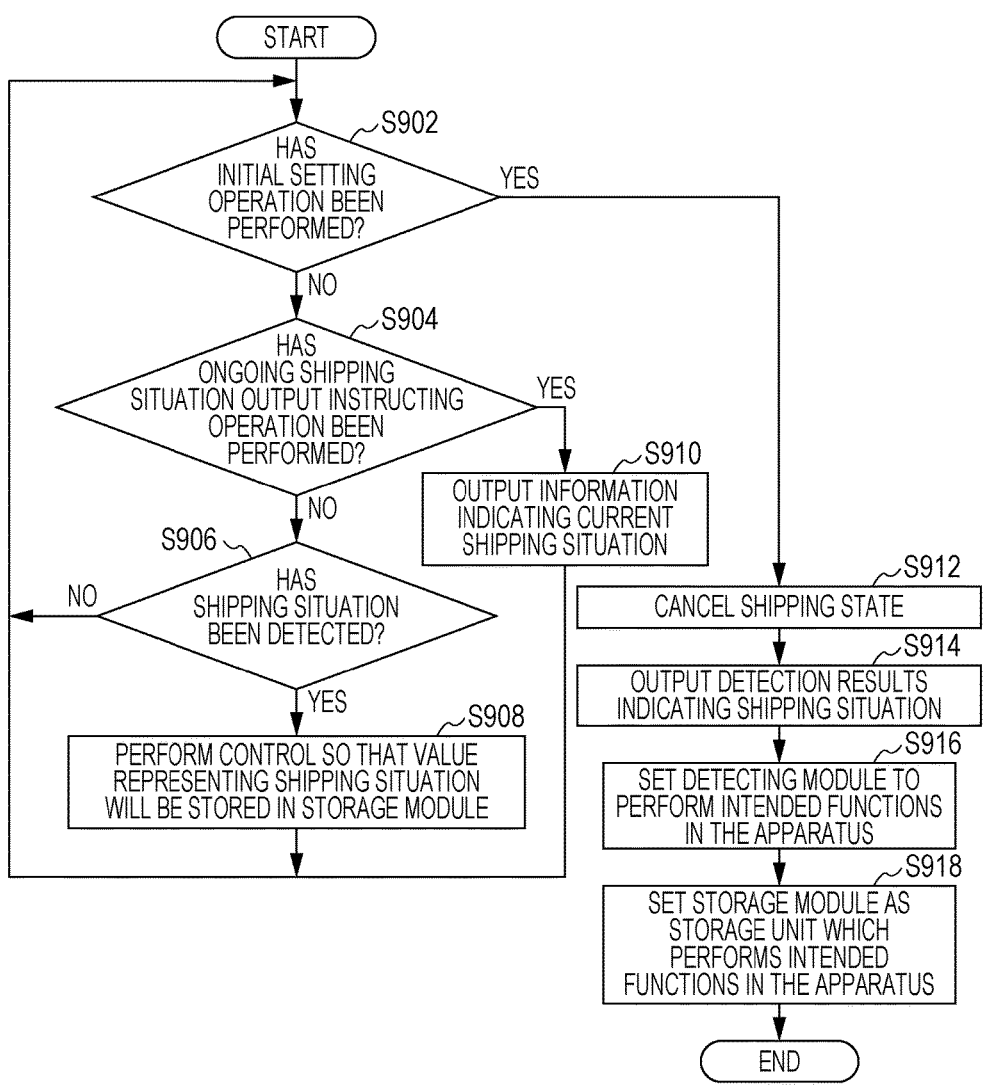
FIG. 9 is a flowchart illustrating an example of processing executed in the second exemplary embodiment.

FIG. 9 is a flowchart illustrating an example of processing executed in the second exemplary embodiment. In the processing shown in FIG. 9, steps S904 and S910 are added to steps shown in FIG. 5.

In step S902, the setting operation detecting module 150 determines whether or not an initial setting operation has been performed. If the result of step S902 is YES, the process proceeds to step S912. If the result of step S902 is NO, the process proceeds to step S904.

In step S904, the ongoing-shipping-situation output instructing operation detecting module 650 determines whether or not an ongoing shipping situation output instructing operation has been performed. If the result of step S904 is YES, the process proceeds to step S910. If the result of step S904 is NO, the process proceeds to step S906.

In step S906, the detecting module 110 determines whether or not the shipping situation has been detected. If the result of step S906 is YES, the process proceeds to step S908. If the result of step S906 is NO, the process returns to step S902. In step S908, the storage control module 120 performs control so that the value representing the shipping situation will be stored in the storage module 130.

In step S910, the output module 160 outputs information indicating the current shipping situation. In step S910, the shipping situation detected so far may be initialized (deleted). In step S910, the output module 160 may output information indicating the shipping situation up to the present time.

In step S912, the storage control module 120 cancels the shipping state.

In step S914, the output module 160 outputs detection results indicating the shipping situation stored in the storage module 130.

In step S916, the detecting module 110 is set so as to perform the intended functions in the apparatus.

In step S918, the storage module 130 is set as a storage unit which performs the intended functions in the apparatus.

Third Exemplary Embodiment

Figure 10:
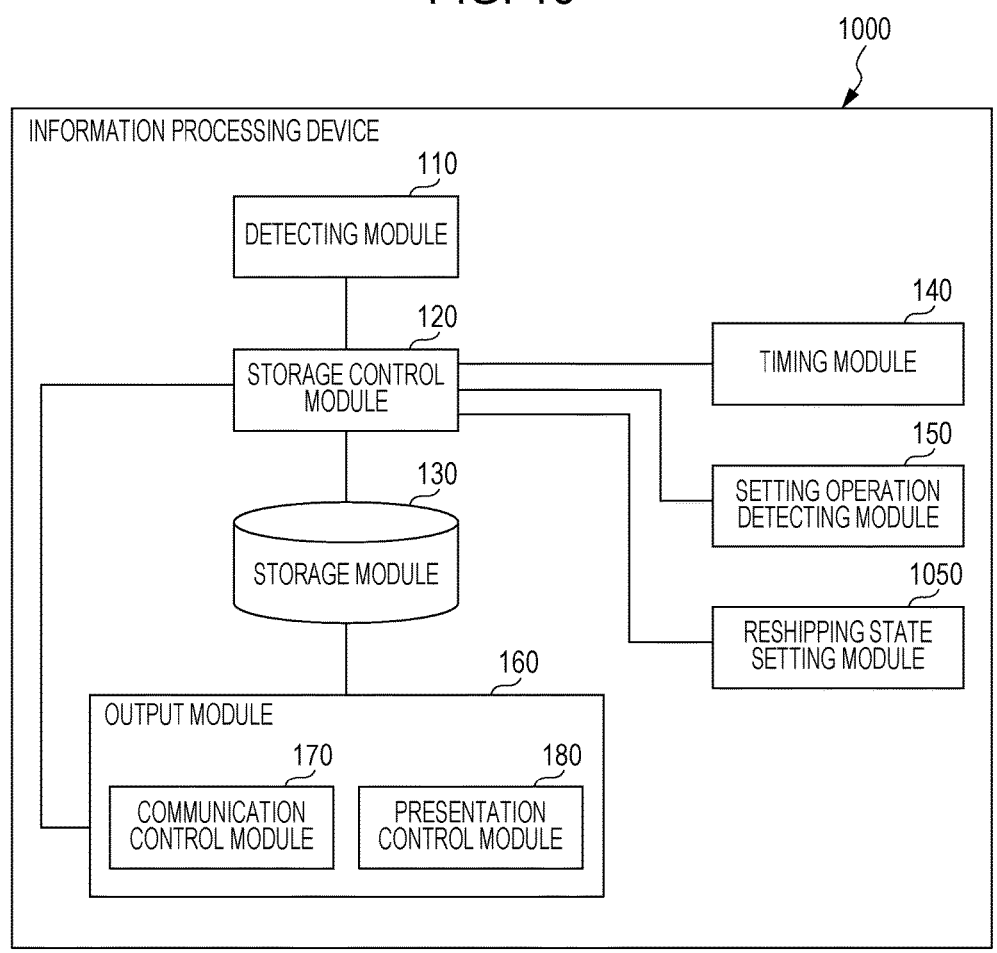
FIG. 10 is a block diagram of conceptual modules forming an example of the configuration of a third exemplary embodiment.

FIG. 10 is a block diagram of conceptual modules forming an example of the configuration of a third exemplary embodiment.

An information processing device 1000 includes a detecting module 110, a storage control module 120, a storage module 130, a timing module 140, a setting operation detecting module 150, a reshipping state setting module 1050, and an output module 160. That is, the reshipping state setting module 1050 is added to the elements of the first exemplary embodiment.

The detecting module 110 is connected to the storage control module 120. After the setting operation detecting module 150 has detected that the predetermined operation has been performed, if the reshipping state setting module 1050 detects that a predetermined third operation has been performed (hereinafter may simply be referred to as "reshipping state setting module 1050 detects the predetermined third operation"), the detecting module 110 restarts to detect the shipping situation. The predetermined third operation is an operation for resetting the state of the apparatus to the shipping state. That is, the detecting module 110 assumes that the apparatus has shifted to the reshipping state and restarts to detect the shipping situation. More specifically, the predetermined third operation corresponds to an operation for shifting (or re-shifting) the state of the apparatus to the shipping state by using, for example, a touch screen of the apparatus.

The timing module 140 is connected to the storage control module 120.

The setting operation detecting module 150 is connected to the storage control module 120.

The reshipping state setting module 1050 is connected to the storage control module 120. The reshipping state setting module 1050 detects the predetermined third operation after the predetermined operation has been detected by the setting operation detecting module 150. The predetermined third operation is an operation for resetting the information processing device 1000 to the shipping state. Accordingly, the predetermined third operation is an operation performed after the shipping of the apparatus has been completed (the predetermined operation has been detected by the setting operation detecting module 150). For example, the predetermined third operation is performed when a product is unpacked in a sales office and is assembled and checked before being shipped to a customer's office. More specifically, an operation for switching ON the operation button for starting (restarting) the shipping state is an example of the predetermined third operation.

The storage module 130 is connected to the storage control module 120 and the output module 160.

The output module 160 includes a communication control module 170 and a presentation control module 180, and is connected to the storage control module 120 and the storage module 130.

The storage control module 120 is connected to the detecting module 110, the storage module 130, the timing module 140, the setting operation detecting module 150, the reshipping state setting module 1050, and the output module 160. After the predetermined operation is detected by the setting operation detecting module 150, if the predetermined third operation is detected by the reshipping state setting module 1050, the storage control module 120 performs control so that the detection results indicating the shipping situation of the apparatus will be stored in the storage module 130. In this case, the storage control module 120 performs control so that the detection results of the detecting module 110 will be stored in the storage module 130 as the reshipping situation. The storage module 130 serves as a storage unit for storing the shipping situation as well as the reshipping situation.

When the predetermined third operation is detected by the reshipping state setting module 1050, the storage control module 120 may delete the detection results indicating the shipping situation stored in the storage module 130. That is, if the apparatus is shifted to the reshipping state, the storage module 130 may be initialized.

Figure 11:
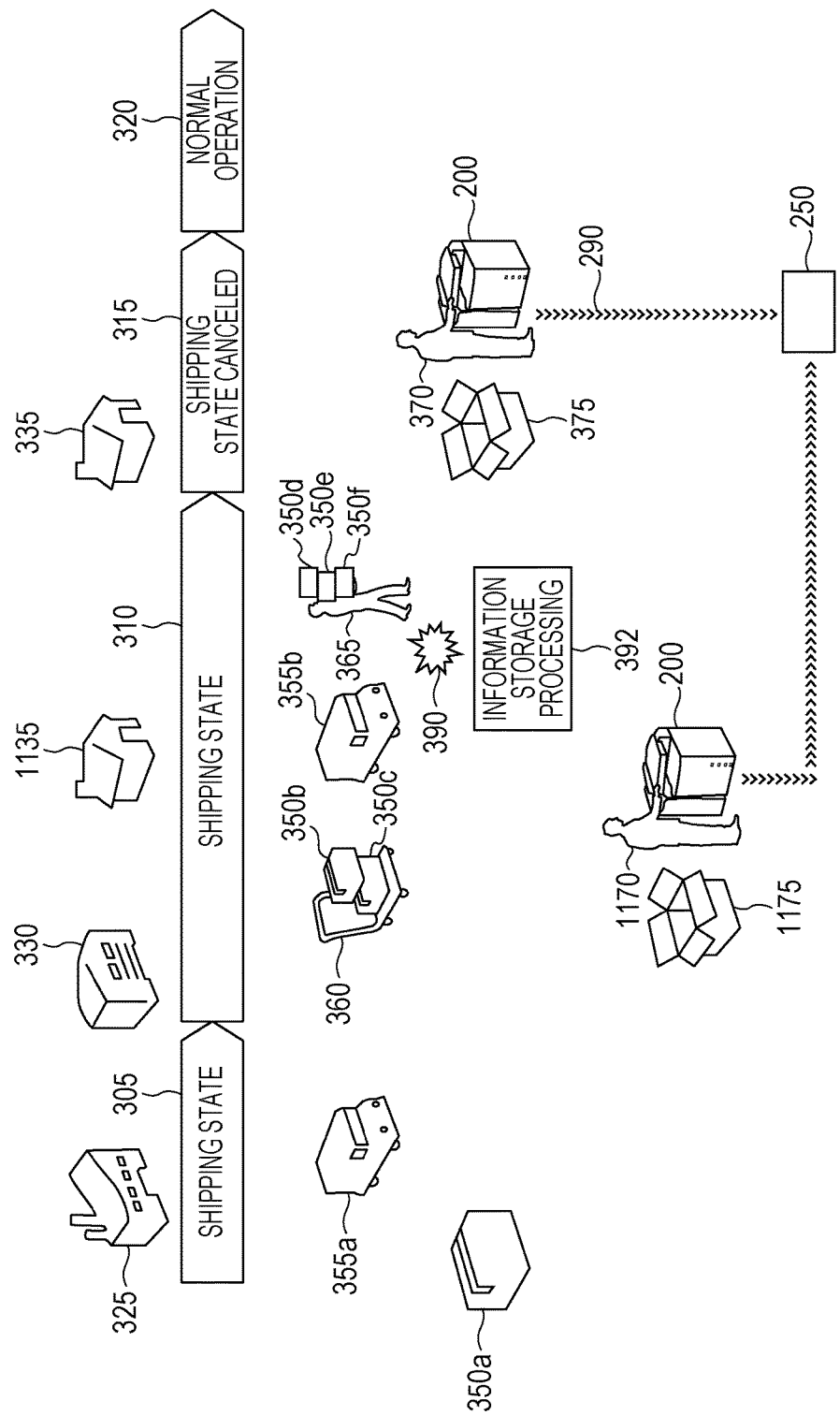
FIG. 11 illustrates an example of processing performed in the third exemplary embodiment.

FIG. 11 illustrates an example of processing performed in the third exemplary embodiment. In the example shown in FIG. 11, during the shipping state 310, in a sales office 1135, an operator 1170 unpacks the packed product 350a, takes out the image processing apparatus 200 from a packing box 1175, checks the image processing apparatus 200, and ships it to the office 335. Such an extra step is added to the example shown in FIG. 3. At this time point, the operator 1170 sets initial settings in the image processing apparatus 200. Accordingly, the detection results indicating the shipping situation up to this time point are sent to the management apparatus 250. Thereafter, the operator 1170 switches ON the operation button for starting (restarting) the shipping state so as to reset the state of the image processing apparatus 200 to the shipping state. After the detection results are sent to the management apparatus 250, the detection results indicating the shipping situation stored in the storage module 130 may be deleted.

Figure 12:
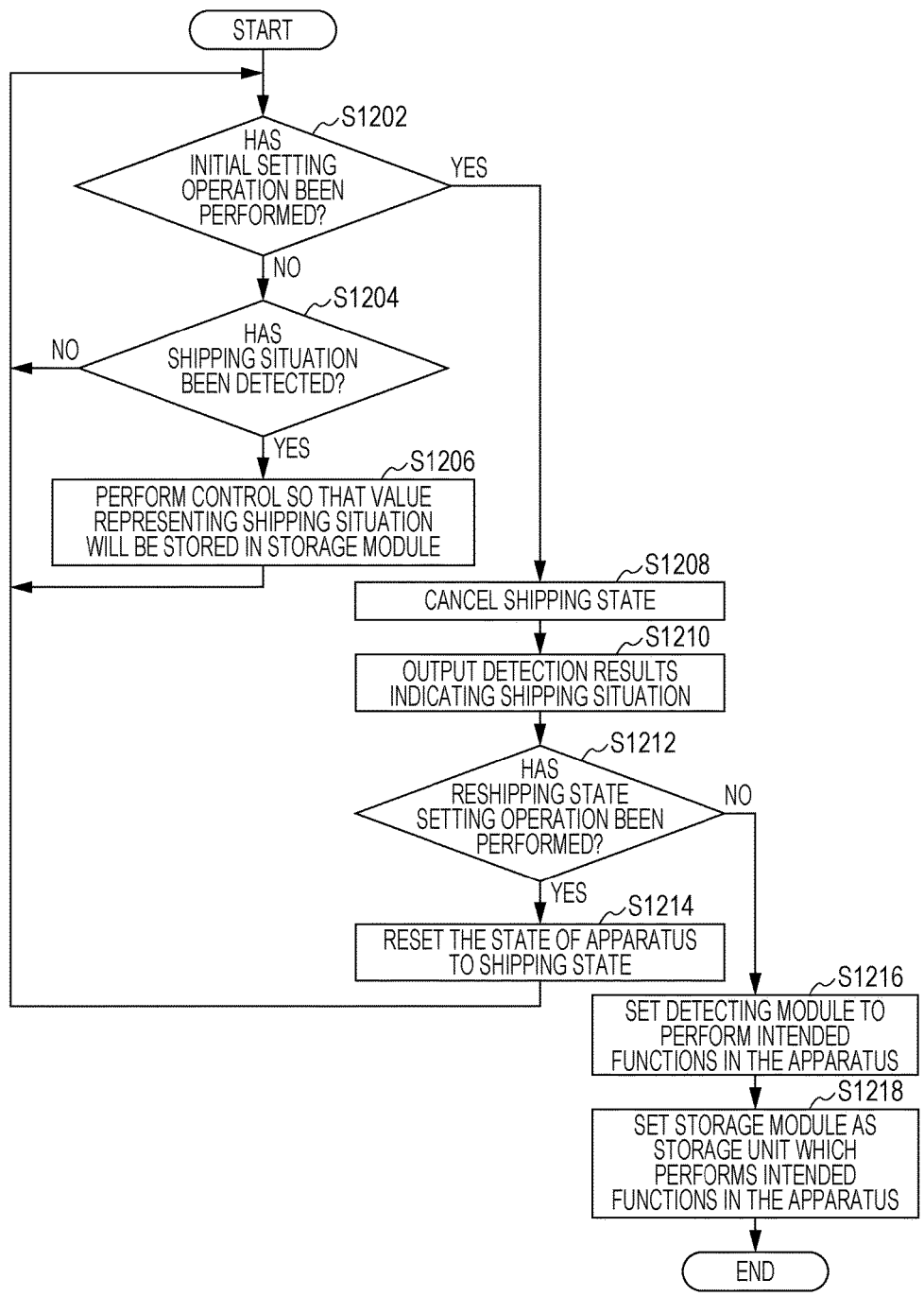
FIG. 12 is a flowchart illustrating an example of processing executed in the third exemplary embodiment.

FIG. 12 is a flowchart illustrating an example of processing executed in the third exemplary embodiment. In the processing shown in FIG. 12, steps S1212 and S1214 are added to steps shown in FIG. 5.

In step S1202, the setting operation detecting module 150 determines whether or not an initial setting operation has been performed. If the result of step S1202 is YES, the process proceeds to step S1208. If the result of step S1202 is NO, the process proceeds to step S1204.

In step S1204, the detecting module 110 determines whether or not the shipping situation has been detected. If the result of step S1204 is YES, the process proceeds to step S1206. If the result of step S1204 is NO, the process returns to step S1202.

In step S1206, the storage control module 120 performs control so that the value representing the shipping situation will be stored in the storage module 130. The process then returns to step S1202.

In step S1208, the storage control module 120 cancels the shipping state.

In step S1210, the output module 160 outputs detection results indicating the shipping situation stored in the storage module 130.

In step S1212, the reshipping state setting module 1050 determines whether or not a reshipping state setting operation has been performed. If the result of step S1212 is YES, the process proceeds to step S1214. If the result of step S1212 is NO, the process proceeds to step S1216.

In step S1214, the state of the apparatus is reset to the shipping state, and the process returns to step S1202. In step S1214, the shipping situation stored in the storage module 130 so far may be initialized (deleted).

In step S1216, the detecting module 110 is set so as to perform the intended functions in the apparatus.

In step S1218, the storage module 130 is set as a storage unit which performs the intended functions in the apparatus.

Steps S1216 and S1218 may be inserted between steps S1210 and S1212. In this case, in step S1214, the detecting module 110 is set as a module for detecting the shipping situation, and the storage module 130 is set as a storage unit for storing the detection results obtained by the detecting module 110.

Fourth Exemplary Embodiment

Figure 13:
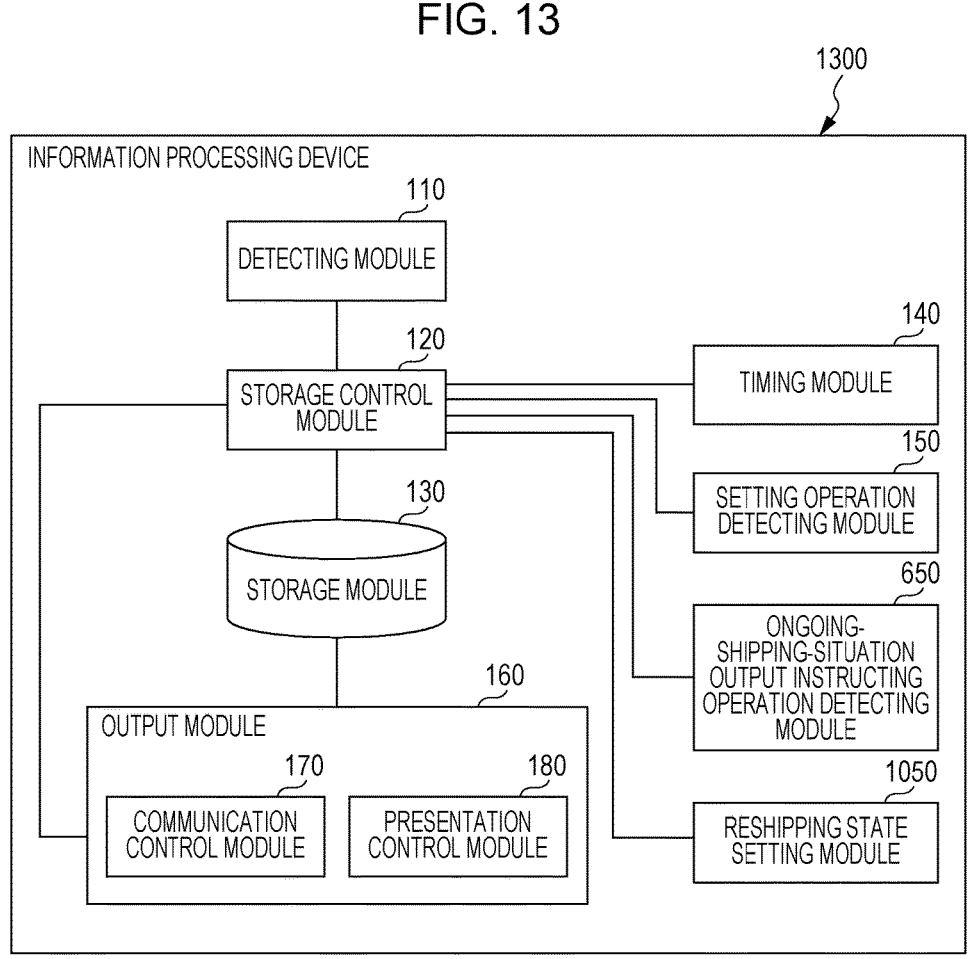
FIG. 13 is a block diagram of conceptual modules forming an example of the configuration of a fourth exemplary embodiment.

FIG. 13 is a block diagram of conceptual modules forming an example of the configuration of a fourth exemplary embodiment.

An information processing device 1300 includes a detecting module 110, a storage control module 120, a storage module 130, a timing module 140, a setting operation detecting module 150, an ongoing-shipping-situation output instructing operation detecting module 650, a reshipping state setting module 1050, and an output module 160. The information processing device 1300 of the fourth exemplary embodiment is a combination of the second and third exemplary embodiments.

The detecting module 110 is connected to the storage control module 120.

The storage control module 120 is connected to the detecting module 110, the storage module 130, the timing module 140, the setting operation detecting module 150, the ongoing-shipping-situation output instructing operation detecting module 650, the reshipping state setting module 1050, and the output module 160.

The storage module 130 is connected to the storage control module 120 and the output module 160.

The timing module 140 is connected to the storage control module 120.

The setting operation detecting module 150 is connected to the storage control module 120.

The ongoing-shipping-situation output instructing operation detecting module 650 is connected to the storage control module 120.

The reshipping state setting module 1050 is connected to the storage control module 120.

The output module 160 includes a communication control module 170 and a presentation control module 180, and is connected to the storage control module 120 and the storage module 130.

Figure 14:
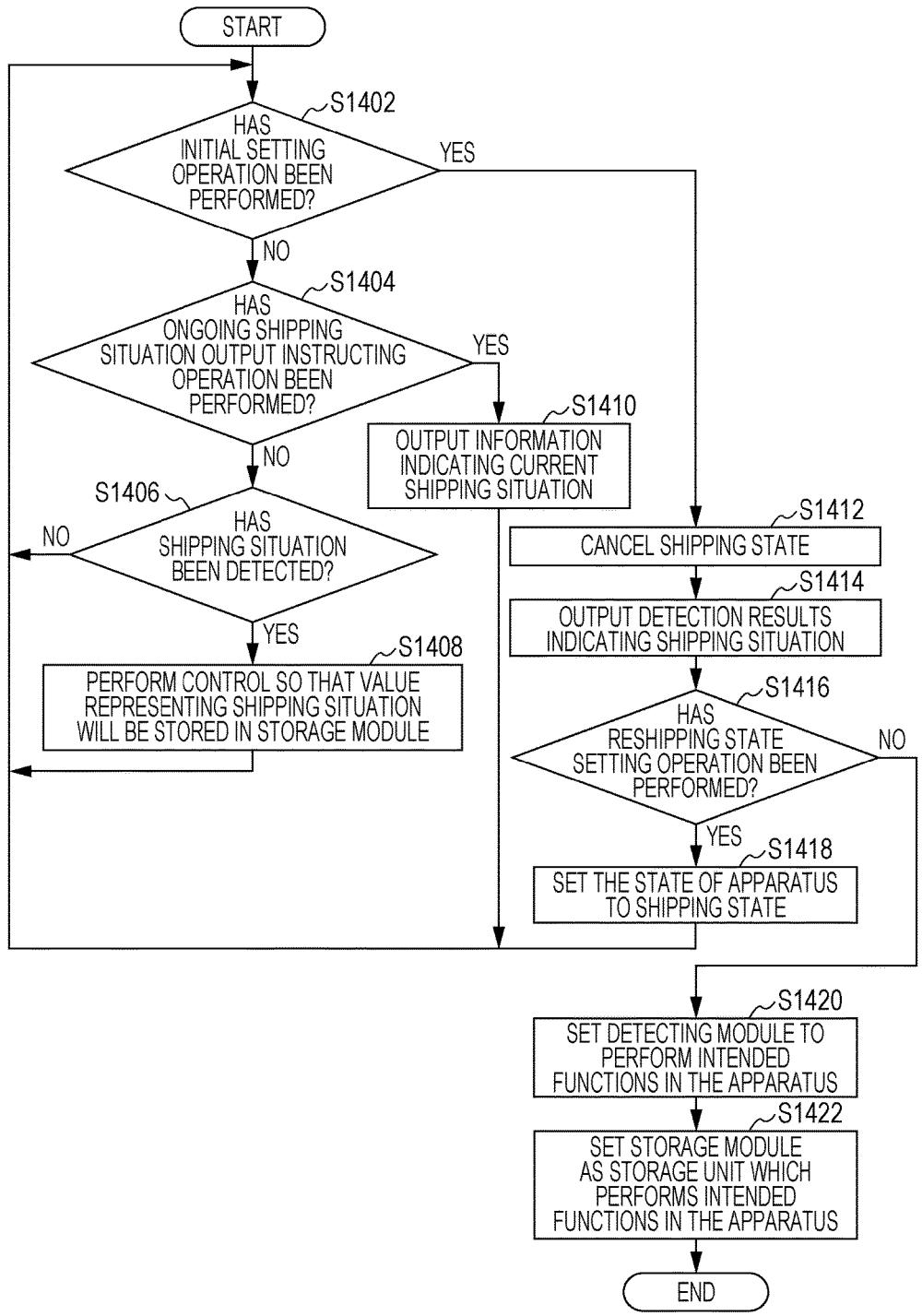
FIG. 14 is a flowchart illustrating an example of processing executed in the fourth exemplary embodiment.

FIG. 14 is a flowchart illustrating an example of processing executed in the fourth exemplary embodiment. The processing shown in FIG. 14 is a combination of the processing of FIG. 9 and the processing of FIG. 12.

In step S1402, the setting operation detecting module 150 determines whether or not an initial setting operation has been performed. If the result of step S1402 is YES, the process proceeds to step S1412. If the result of step S1402 is NO, the process proceeds to step S1404.

In step S1404, the ongoing-shipping-situation output instructing operation detecting module 650 determines whether or not an ongoing shipping situation output instructing operation has been performed. If the result of step S1404 is YES, the process proceeds to step S1410. If the result of step S1404 is NO, the process proceeds to step S1406.

In step S1406, the detecting module 110 determines whether or not the shipping situation has been detected. If the result of step S1406 is YES, the process proceeds to step S1408. If the result of step S1406 is NO, the process returns to step S1402.

In step S1408, the storage control module 120 performs control so that the value representing the shipping situation will be stored in the storage module 130. The process then returns to step S1402.

In step S1410, the output module 160 outputs information indicating the current shipping situation. In step S1410, the shipping situation detected so far may be initialized (deleted).

In step S1412, the storage control module 120 cancels the shipping state.

In step S1414, the output module 160 outputs detection results indicating the shipping situation stored in the storage module 130.

In step S1416, the reshipping state setting module 1050 determines whether or not a reshipping state setting operation has been performed. If the result of step S1416 is YES, the process proceeds to step S1418. If the result of step S1416 is NO, the process proceeds to step S1420.

In step S1418, the state of the apparatus is set to the shipping state, and the process returns to step S1402. In step S1418, the shipping situation detected so far may be initialized (deleted).

In step S1420, the detecting module 110 is set so as to perform the intended functions in the apparatus.

In step S1422, the storage module 130 is set as a storage unit which performs the intended functions in the apparatus.

In the above-described exemplary embodiments, a single apparatus is shipped. If plural different apparatuses (apparatuses equipped with different sensors) are shipped, values detected by a sensor which is not included in a certain apparatus may be supplied from another apparatus including this sensor. There may be even a case in which some apparatuses do not have any sensor. In such a situation, the information processing devices included in the different apparatuses perform near field communication so that each information processing device informs the other information processing devices of which sensors are included in the apparatus. Then, the information processing device of an apparatus A, for example, specifies which sensor is not included in the apparatus A, and requests the information processing device of an apparatus B including this sensor to send values detected by this sensor to the information processing device of the apparatus A. The information processing device of the apparatus B then sends the values detected by the sensor to the information processing device of the apparatus A. The information processing device of the apparatus A receives the values and treats them in a manner similar to those detected by the detecting module 110 of the information processing device of the apparatus A. In this manner, when different apparatuses are shipped, by compensating for a sensor which is not included in one apparatus by the sensor which is included in another apparatus, more information concerning the shipping situation can be obtained than a case in which a single apparatus is shipped.

Figure 15:
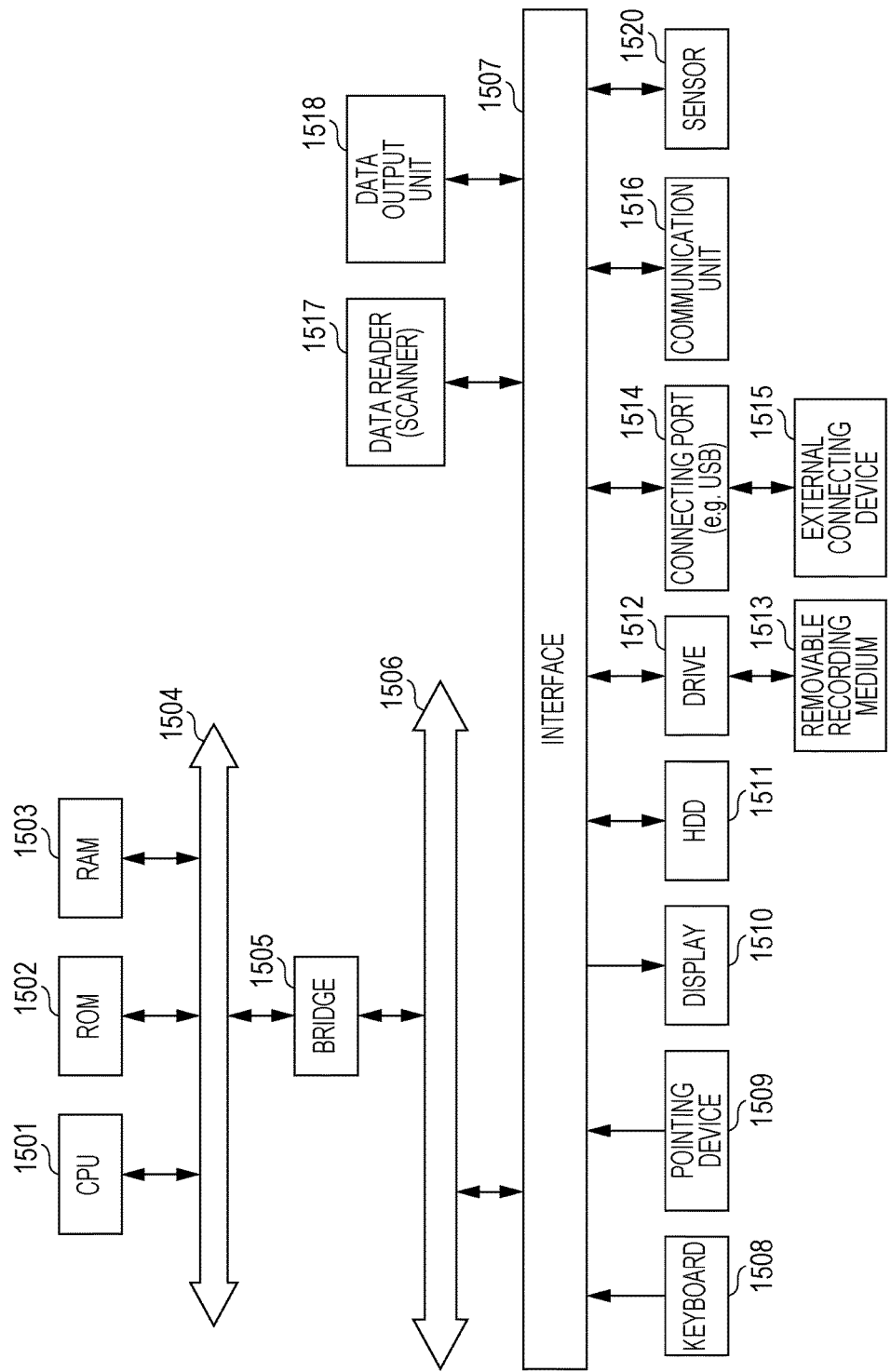
FIG. 15 is a block diagram illustrating an example of the hardware configuration of a computer implementing an exemplary embodiment of the invention.

An example of the hardware configuration of an image processing apparatus, which is an apparatus in which the information processing device of one of the exemplary embodiments is integrated, will be described below with reference to FIG. 15. The hardware configuration shown in FIG. 15 is implemented as a PC, for example, and includes a data reader 1517, such as a scanner, and an output unit 1518, such as a printer.

A CPU 1501 is a control unit that executes processing in accordance with a computer program describing an execution sequence of the modules of the above-described exemplary embodiments, that is, the storage control module 120, the setting operation detecting module 150, the output module 160, the ongoing-shipping-situation output instructing operation detecting module 650, and the reshipping state setting module 1050.

A read only memory (ROM) 1502 stores therein programs and operation parameters used by the CPU 1501. A RAM 1503 has functions as the storage module 130 and stores therein programs used during the execution of the CPU 1501 and parameters which change appropriately during the execution of the programs. The CPU 1501, the ROM 1502, and the RAM 1503 are connected to one another via a host bus 1504, which is constituted by, for example, a CPU bus.

The host bus 1504 is connected to an external bus 1506, such as a peripheral component interconnect/interface (PCI) bus, via a bridge 1505.

A keyboard 1508 and a pointing device 1509, such as a mouse, are devices operated by an operator. A display 1510 is, for example, a liquid crystal display or a cathode ray tube (CRT), and displays various items of information as text or image information. Alternatively, a touch screen having both of the functions of the pointing device 1509 and the display 1510 may be provided.

A hard disk drive (HDD) 1511 has a built-in hard disk (may alternatively be, for example, a flash memory) and drives the hard disk so as to record or play back information or programs executed by the CPU 1501. When power is turned ON, detection results, for example, stored in the RAM 1503 may be stored in the hard disk. Various other items of data and various other computer programs are also stored in the hard disk.

A drive 1512 reads data or a program recorded in a removable recording medium 1513, such as a magnetic disk, an optical disc, a magneto-optical disk, and a semiconductor memory, and supplies the read data or program to the RAM 1503 via an interface 1507, the external bus 1506, the bridge 1505, and the host bus 1504. The removable recording medium 1513 is also usable as a data recording region.

A connecting port 1514 is a port for connecting the PC to an external connecting device 1515, and has a connecting portion, such as a universal serial bus (USB) port or an IEEE1394 port. The connecting port 1514 is connected to, for example, the CPU 1501, via the interface 1507, the external bus 1506, the bridge 1505, and the host bus 1504. A communication unit 1516 is connected to a connection line and executes data communication processing with an external source. The data reader 1517 is, for example, a scanner, and executes processing for reading documents. The data output unit 1518 is, for example, a printer, and executes processing for outputting document data. A sensor 1520 corresponds to the detecting module 110 and may be a thermo-hygrometer, an acceleration sensor, or vibration sensor. The sensor 1520 may include multiple sensors (multiple sensors of one type or multiple sensors of different types), which detect the operating conditions of the data reader 1517 and the data output unit 1518.

The hardware configuration of the image processing apparatus shown in FIG. 15 is only an example, and the image processing apparatus in the exemplary embodiments may be configured in any manner as long as the modules described in the exemplary embodiments are executable. For example, some modules may be configured as dedicated hardware (for example, an application specific integrated circuit (ASIC)), or some modules may be installed in an external system and be connected to the PC via a communication line. Alternatively, a system, such as that shown in FIG. 15, may be connected to a system, such as that shown in FIG. 15, via a communication line, and may be operated in cooperation with each other. Additionally, instead of into a PC, the modules may be integrated into a mobile information communication device, a home information appliance, a robot, a copying machine, a fax machine, a scanner, a printer, or a multifunction device.

The above-described program may be stored in a recording medium and be provided. The program recorded on a recording medium may be provided via a communication medium. In this case, the above-described program may be implemented as a "non-transitory computer readable medium storing the program therein" in the exemplary embodiments of the invention.

The "non-transitory computer readable medium storing a program therein" is a recording medium storing a program therein that can be read by a computer, and is used for installing, executing, and distributing the program.

Examples of the recording medium are digital versatile disks (DVDs), and more specifically, DVDs standardized by the DVD Forum, such as DVD-R, DVD-RW, and DVD-RAM, DVDs standardized by the DVD+RW Alliance, such as DVD+R and DVD+RW, compact discs (CDs), and more specifically, a read only memory (CD-ROM), a CD recordable (CD-R), and a CD rewritable (CD-RW), Blu-ray disc (registered trademark), a magneto-optical disk (MO), a flexible disk (FD), magnetic tape, a hard disk, a ROM, an electrically erasable programmable read only memory (EEPROM) (registered trademark), a flash memory, a RAM, a secure digital (SD) memory card, etc.

The entirety or part of the above-described program may be recorded on such a recording medium and stored therein or distributed. Alternatively, the entirety or part of the program may be transmitted through communication by using a transmission medium, such as a wired network used for a local area network (LAN), a metropolitan area network (MAN), a wide area network (WAN), the Internet, an intranet, or an extranet, a wireless communication network, or a combination of such networks. The program may be transmitted by using carrier waves.

The above-described program may be the entirety or part of another program, or may be recorded, together with another program, on a recording medium. The program may be divided and recorded on plural recording media. Further, the program may be recorded in any form, for example, it may be compressed or encrypted, as long as it can be reconstructed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
 a first detector that detects a shipping situation of an apparatus;
 a second detector that detects that a predetermined operation has been performed; and
 a controller that performs control so that a detection result indicating the shipping situation of the apparatus will be stored in a first memory until the second detector detects that the predetermined operation has been performed,
 wherein, after the second detector detects that the predetermined operation has been performed, the first detector is switched to be able to detect an operating condition of the apparatus.

2. The information processing device according to claim 1, wherein the predetermined operation is an operation for making the apparatus usable.

3. The information processing device according to claim 1, wherein a time interval at which the first detector detects the shipping situation is changed between before and after the first detector is switched to be able to detect the operating condition of the apparatus.

4. The information processing device according to claim 1, wherein the sensitivity with which the first detector detects the shipping situation is changed between before and after the first detector is switched to be able to detect the operating condition of the apparatus.

5. The information processing device according to claim 1, wherein, if the second detector detects that the predetermined operation has been performed, the controller is switched to a controller that performs control so that settings of the apparatus will be stored in a second memory in accordance with the shipping situation.

6. The information processing device according to claim 1, further comprising:
 an output unit that outputs a detection result indicating the shipping situation stored in the first memory if the second detector detects that the predetermined operation has been performed.

7. The information processing device according to claim 1, wherein, if a value representing a detection result indicating the shipping situation detected by the first detector is within a predetermined range, the controller performs control so that the detection result will be stored in the first memory.

8. The information processing device according to claim 1, further comprising:
 a warning unit that outputs a warning if a value representing a detection result indicating the shipping situation detected by the first detector is within a predetermined range.

9. The information processing device according to claim 8, wherein the predetermined range is changed between before and after the first detector is switched to be able to detect the operating condition of the apparatus.

10. The information processing device according to claim 6, wherein, if it is detected that a predetermined second operation has been performed before the second detector detects that the predetermined operation is performed, the output unit outputs a detection result indicating the shipping situation stored in the first memory.

11. The information processing device according to claim 10, wherein the predetermined second operation is an operation for giving an instruction to output information concerning an ongoing shipping situation.

12. The information processing device according to claim 10, wherein, after it is detected that the predetermined second operation has been performed and the output unit has output a detection result indicating the shipping situation stored in the first memory, the controller deletes the detection result stored in the first memory.

13. The information processing device according to claim 1, wherein, if it is detected that a predetermined third operation has been performed after the second detector has detected that the predetermined operation has been performed, the first detector is switched to be able to detect the shipping situation.

14. The information processing device according to claim 1, wherein, if it is detected that a predetermined third operation has been performed after the second detector has detected that the predetermined operation has been performed, the controller performs control so that a detection result indicating the shipping situation of the apparatus will be stored in the first memory.

15. The information processing device according to claim 14, wherein the predetermined third operation is an operation for resetting a state of the apparatus to a shipping state.

16. The information processing device according to claim 13, wherein, if it is detected that the predetermined third operation has been performed, the controller deletes a detection result indicating the shipping situation stored in the first memory.

17. An information processing method comprising:
 detecting a shipping situation of an apparatus;
 detecting that a predetermined operation has been performed;
 performing control so that a detection result indicating the shipping situation of the apparatus will be stored in a first memory until it is detected that the predetermined operation has been performed; and
 switching the detecting of the shipping situation of the apparatus to detecting of an operating condition of the apparatus after it is detected that the predetermined operation has been performed.

18. A non-transitory computer readable medium storing a program causing a computer to execute a process, the process comprising:
 detecting a shipping situation of an apparatus including the computer;
 detecting that a predetermined operation has been performed;
 performing control so that a detection result indicating the shipping situation of the apparatus will be stored in a first memory until it is detected that the predetermined operation has been performed; and switching the detecting of the shipping situation of the apparatus to detecting of an operating condition of the apparatus after it is detected that the predetermined operation has been performed.

\* \* \* \* \*